US007546199B2

(12) United States Patent
Kato

(10) Patent No.: US 7,546,199 B2
(45) Date of Patent: Jun. 9, 2009

(54) SHUT-DOWN CONTROL DEVICE OF INTERNAL COMBUSTION ENGINE

(75) Inventor: Minoru Kato, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 328 days.

(21) Appl. No.: 11/632,854

(22) PCT Filed: Jul. 11, 2005

(86) PCT No.: PCT/JP2005/013206

§ 371 (c)(1), (2), (4) Date: Jan. 19, 2007

(87) PCT Pub. No.: WO2006/025160

PCT Pub. Date: Mar. 9, 2006

(65) Prior Publication Data

US 2008/0091336 A1 Apr. 17, 2008

(30) Foreign Application Priority Data

Sep. 1, 2004 (JP) ............................. 2004-254624

(51) Int. Cl.
*G06F 19/00* (2006.01)
*F02N 17/00* (2006.01)

(52) U.S. Cl. ..................... 701/112; 123/179.4; 123/460

(58) Field of Classification Search ................. 701/112, 701/114, 115; 123/179.4, 456, 460, 511
See application file for complete search history.

(56) References Cited

U.S. PATENT DOCUMENTS

| | | | | |
|---|---|---|---|---|
| 4,213,435 | A * | 7/1980 | Simko | 123/389 |
| 6,497,217 | B2 * | 12/2002 | Kojima | 123/456 |
| 7,082,899 | B2 * | 8/2006 | Hanson et al. | 123/41 E |
| 2001/0054412 | A1 * | 12/2001 | Kojima | 123/456 |
| 2003/0213454 | A1 | 11/2003 | Grieser et al. | |
| 2004/0159297 | A1 | 8/2004 | Kataoka et al. | |

FOREIGN PATENT DOCUMENTS

| | | | |
|---|---|---|---|
| DE | 101 23 037 | A1 | 11/2002 |
| EP | 1 074 713 | A1 | 2/2001 |
| EP | 1 439 295 | A2 | 7/2004 |
| JP | A 11-201008 | | 7/1999 |
| JP | A 2001-173473 | | 6/2001 |
| JP | A 2002-004929 | | 1/2002 |
| JP | A 2002-317702 | | 10/2002 |

* cited by examiner

*Primary Examiner*—John T Kwon
(74) *Attorney, Agent, or Firm*—Oliff & Berridge, PLC

(57) ABSTRACT

A plurality of pistons are slidably provided in cylinders of an engine respectively. The engine includes a plurality of connection pipes connecting cylinders successively experiencing combustion to each other during operation of engine, a plurality of opening-closing valves for setting each of connection pipes to a connected state or a closed state, and an ECU for controlling the plurality of opening-closing valves such that the piston is stopped at a predetermined position when the operation of the engine is stopped.

8 Claims, 5 Drawing Sheets

SHUT-DOWN CONTROL DEVICE OF INTERNAL COMBUSTION ENGINE

TECHNICAL FIELD

The present invention relates to a control device of an internal combustion engine, and more particularly to a control device of an internal combustion engine controlling a stop position of a piston in a cylinder when the internal combustion engine is stopped.

BACKGROUND ART

From a viewpoint of preventing global warming or saving energy, an idling stop system (also referred to as an economy-running system or an engine automatic stop-and-start system) in which an engine is automatically stopped when a vehicle stops on a red light at an intersection or the like and is restarted in response to an operation by a driver to start running again (an operation such as pressing down an accelerator pedal or stopping pressing a brake pedal) has been put into practical use.

In the vehicle incorporating such an idling stop system, when a predetermined condition for stopping is satisfied, the vehicle is controlled to stop the engine. In order to improve start-up property at the time of restart, a technique to stop the engine at a desired crank angle has been available. For example, Japanese Patent Laying-Open No. 2001-173473 discloses a control device of an internal combustion engine achieving improvement in start-up property of an engine by stopping the same at a desired crank angle. When it is determined that the condition for stopping the engine is satisfied, the control device of an internal combustion engine raises a manifold pressure and thereafter stops the engine.

According to the control device of the internal combustion engine disclosed in the above-mentioned publication, the manifold pressure is raised before the engine is stopped, so that a pressure in a combustion chamber of the engine is raised. Receiving such a pressure, a piston does not go beyond a compression top dead center, and the crank angle of the piston can be stopped at a desired angle (approximately BTDC 60° CA) before the TDC (Top Dead Center). Consequently, a cylinder before reaching the compression top dead center is ignited at the time of restart, whereby the start-up property of the engine is improved.

It is also possible to quickly restart the engine in a manner different from the publication described above. Specifically, when the engine of the vehicle incorporating the idling stop system is stopped, a fuel is injected in advance into a cylinder in an expansion stroke, and thereafter the engine is stopped. Then, the cylinder in the expansion stroke is ignited at next ignition and start.

In particular in a port injection type engine, in order to inject the fuel in advance into the cylinder in the expansion stroke, it is necessary to inject the fuel while the cylinder is in an intake stroke preceding the expansion stroke, and to stop the cylinder to be ignited at the time of restart when it enters the expansion stroke. On the other hand, if the fuel is injected in advance in the intake stroke, a pressure of an air-fuel mixture is raised in the compression stroke, and autoignition is likely. If autoignition occurs, torque is generated, which results in difficulty in controlling the piston or a crankshaft to stop at a desired position. In addition, if autoignition occurs, desired torque cannot be obtained even if the cylinder in the expansion stroke is ignited at the time of restart. That is, the start-up property of the engine is deteriorated.

Moreover, as in the control device of the internal combustion engine disclosed in the publication mentioned above, a stop position of the crankshaft cannot accurately be controlled with a throttle and an intake/exhaust valve alone, which results in deterioration of the start-up property. Furthermore, if the manifold pressure is increased as in the control device of the internal combustion engine disclosed in the publication mentioned above, magnitude of torque fluctuation becomes great, which leads to generation of vibration when the engine is stopped. As described above, when the stop position is controlled by raising the manifold pressure, the stop position cannot be controlled with high accuracy, and vibration is generated.

DISCLOSURE OF THE INVENTION

An object of the present invention is to provide a control device of an internal combustion engine capable of controlling a stop position of a piston with high accuracy, while suppressing generation of vibration.

A control device of an internal combustion engine according to one aspect of the present invention is a control device of an internal combustion engine having a plurality of cylinders. In the cylinders, a plurality of pistons are slidably provided respectively. The control device includes: a plurality of connection paths connecting cylinders successively experiencing combustion to each other when the internal combustion engine is operating; a plurality of opening-closing portions setting each connection path to any one of a connected state and a closed state; and a control unit controlling the plurality of opening-closing portions such that the piston is stopped at a predetermined position when the operation of the internal combustion engine is stopped.

According to the present invention, in the internal combustion engine having a plurality of cylinders, the opening-closing portion provided in the connection path connecting the cylinders successively experiencing combustion to each other is controlled so as to stop the piston at the predetermined position. In other words, the cylinder in the compression stroke and the cylinder in the expansion stroke which will experience combustion in the next place among the plurality of cylinders are connected to each other, so that an air-fuel mixture is permitted to flow from the cylinder in the compression stroke to the cylinder in the expansion stroke. The air-fuel mixture flows into the cylinder being in the expansion stroke when the internal combustion engine is stopped, to lower the pressure in the cylinder in the compression stroke, whereby autoignition can be avoided. Therefore, deterioration in accuracy of the stop position due to the torque generated by autoignition can be suppressed. In addition, the pressure within the combustion chamber in the cylinder in the compression stroke is lowered, so as to weaken force against the motion of the piston. Accordingly, the stop position of the piston can be controlled by controlling the opening-closing portion, and the piston can be controlled to stop at a desired position with high accuracy. Therefore, the internal combustion engine quickly starts and desired torque can be generated at the time of restart of the internal combustion engine. In addition, when the pressure in the cylinder in the compression stroke is lowered and the pressure in the cylinder in the expansion stroke is raised, magnitude of torque fluctuation becomes small, whereby generation of vibration can be lowered. Consequently, a control device of an internal combustion engine capable of controlling a stop position of a piston with high accuracy while suppressing generation of vibration, can be provided.

Preferably, each piston is connected to an output shaft of the internal combustion engine. The control device further includes: a sensing unit sensing an angle of rotation and speed of rotation of the output shaft, an estimation unit estimating, among the plurality of cylinders, a cylinder being in a compression stroke when the operation of the internal combustion engine, based on the angle of rotation and the speed of rotation, and a fuel control unit controlling fuel injection such that a fuel is injected when the speed of rotation is not larger than a predetermined speed of rotation and when the estimated cylinder is in an intake stroke. The control unit controls the opening-closing portions such that the connected state is established between the estimated cylinder and a cylinder in an expansion stroke.

According to the present invention, the control device estimates, among the plurality of cylinders, a cylinder being in the compression stroke when the operation of the internal combustion engine is stopped, based on the angle of rotation and the speed of rotation of the output shaft, and injects the fuel when the speed of rotation is not larger than a predetermined speed of rotation and when the estimated cylinder is in the intake stroke. The control unit controls the opening-closing portions such that the connected state is established between the estimated cylinder and the cylinder in the expansion stroke. The cylinder in the compression stroke and the cylinder in the expansion stroke which will experience combustion in the next place among the plurality of cylinders are connected to each other, so that an air-fuel mixture is permitted to flow from the cylinder in the compression stroke to the cylinder in the expansion stroke. The air-fuel mixture can thus flow into the cylinder being in the expansion stroke when the internal combustion engine is stopped, to lower the pressure in the cylinder in the compression stroke, whereby autoignition is avoided. In addition, the pressure within the combustion chamber in the cylinder being in the compression stroke when the engine is stopped is lowered, so as to weaken force against the motion of the piston (force suppressing the motion of the piston). Accordingly, when the internal combustion engine is stopped, the stop position of the piston can be controlled. The piston can thus be stopped at a desired position, and the start-up property of the internal combustion engine at the time of restart is improved.

More preferably, the control unit calculates angular acceleration of the output shaft based on the speed of rotation, and controls the opening-closing portions such that the connected state is established between a cylinder in the compression stroke and a cylinder in the expansion stroke when the angular acceleration is not larger than a predetermined first value and that the closed state is established therebetween when the angular acceleration is not smaller than a predetermined second value.

According to the present invention, the control unit controls the opening-closing portions such that the connected state is established between the estimated cylinder and the cylinder in the expansion stroke when the calculated angular acceleration is not larger than the predetermined first value and that the closed state is established therebetween when the angular acceleration is not smaller than the predetermined second value. In this manner, by setting the first and second values to appropriate values, timing to establish the connected state between the cylinder in the compression stroke and the cylinder in the expansion stroke and timing to establish the closed state therebetween can properly be set. Accordingly, the pressure in the combustion chamber of the cylinder in the compression stroke can be controlled, so as to lower vibration. In addition, when the internal combustion engine is stopped, the stop position of the piston can be controlled. The piston can thus be stopped at a desired position, and the start-up property of the internal combustion engine at the time of restart is improved.

More preferably, the internal combustion engine is a port injection type engine.

According to the present invention, when the present invention is applied to the port injection type engine, the air-fuel mixture can flow from the cylinder in the compression stroke to the cylinder in the expansion stroke when the engine is stopped, so as to suppress occurrence of autoignition in the compression stroke. In addition, the pressure in the combustion chamber of the cylinder in the compression stroke is controlled, so as to control the stop position of the piston. Therefore, the output shaft of the engine can be stopped at a desired position, and the start-up property of the engine at the time of restart is improved.

BEST MODES FOR CARRYING OUT THE INVENTION

Figure 1:
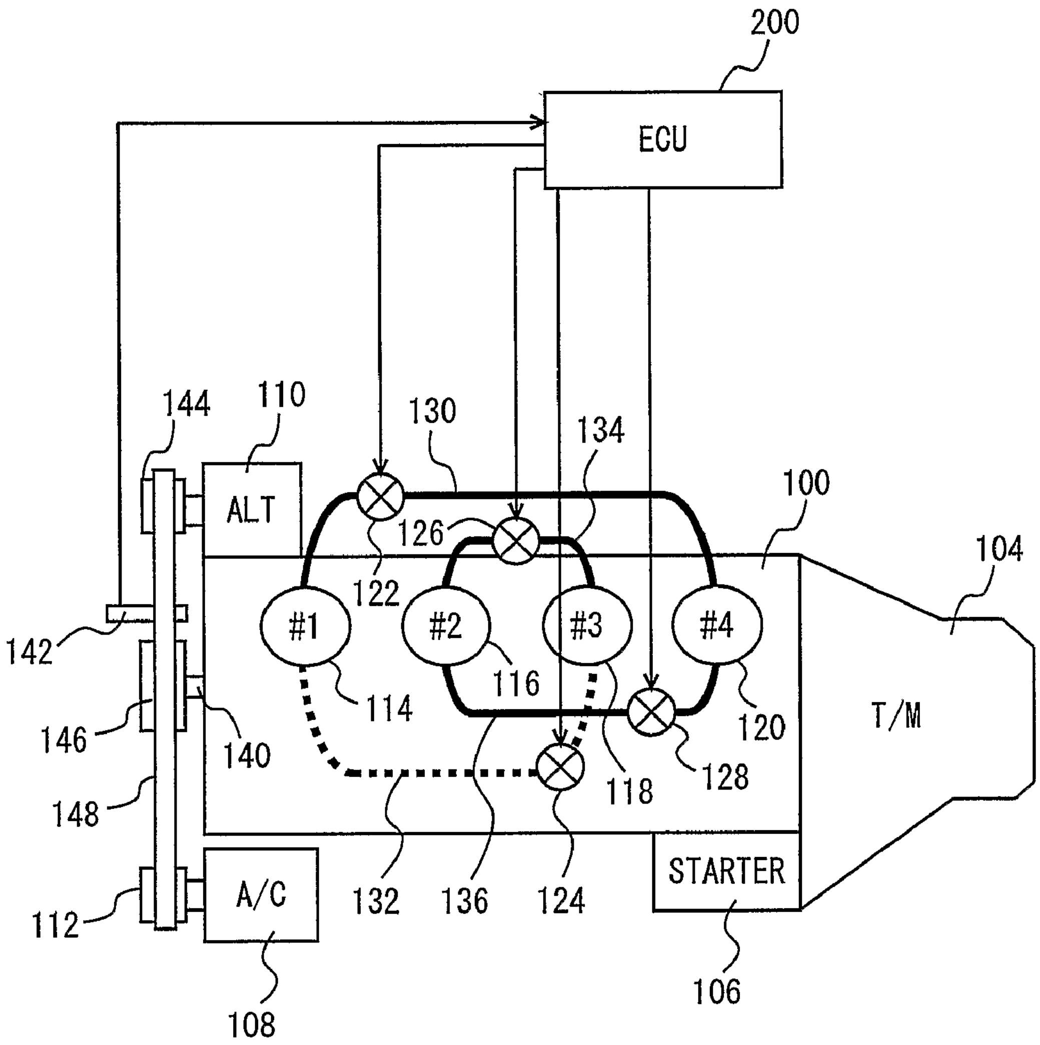
FIG. 1 shows an overall configuration of a control device of an internal combustion engine according to the present embodiment.

A control device of an internal combustion engine according to an embodiment of the present invention will be described hereinafter with reference to the drawings. In the description below, the same elements have the same reference characters allotted, and their label and function are also identical. Therefore, detailed description thereof will not be repeated. The present invention is applied, for example, to a vehicle incorporating an idling stop system frequently restarting an engine (hereinafter, also denoted as an eco-run vehicle) or a hybrid vehicle, however, the application is not particularly limited thereto.

As shown in FIG. 1, the vehicle incorporating the control device of the internal combustion engine according to the present embodiment includes an engine 100, a transmission 104, a starter 106, an air-conditioner compressor 108, an alternator 110, and an ECU 200. The control device according to the present embodiment is implemented by ECU 200. In the present embodiment, engine 100 is a port injection type engine.

Transmission 104 is not particularly limited, and it may be a manual transmission, or a gear type or continuously variable automatic transmission.

In a cylinder block of engine 100, a cylinder (1) 114 to a cylinder (4) 120 are provided. In the present invention, a 4-cylinder gasoline engine will be described, however, the number of cylinders is not particularly limited to four.

A plurality of pistons (not shown) are slidably provided in cylinder (1) 114 to cylinder (4) 120 respectively. In addition, a connection pipe (1) 130 to a connection pipe (4) 136 connecting the cylinders successively experiencing combustion to each other during operation of engine 100 are provided in cylinder (1) 114 to cylinder (4) 120 respectively. The connection pipes are provided with an opening-closing valve (1) 122 to an opening-closing valve (4) 128 respectively.

Specifically, cylinder (1) 114 and cylinder (4) 120 are connected to each other by connection pipe (1) 130. Opening-closing valve (1) 122 for setting connection pipe (1) 130 to either the connected state or the closed state is provided in a midpoint of connection pipe (1) 130.

Cylinder (1) 114 and cylinder (3) 118 are connected to each other by connection pipe (2) 132. Opening-closing valve (2) 124 for setting connection pipe (2) 132 to either the connected state or the closed state is provided in a midpoint of connection pipe (2) 132.

Cylinder (2) 116 and cylinder (3) 118 are connected to each other by connection pipe (3) 134. Opening-closing valve (3) 126 for setting connection pipe (3) 134 to either the connected state or the closed state is provided in a midpoint of connection pipe (3) 134.

Cylinder (2) 116 and cylinder (4) 120 are connected to each other by connection pipe (4) 136. Opening-closing valve (4) 128 for setting connection pipe (4) 136 to either the connected state or the closed state is provided in a midpoint of connection pipe (4) 136. In the present embodiment, combustion takes place sequentially in the order of cylinder (1) 114, cylinder (4) 120, cylinder (2) 116, and cylinder (3) 118, however, the present embodiment is not particularly limited to this order.

Opening-closing valve (1) 122 to opening-closing valve (4) 128 are, for example, electromagnetic valves. Each of opening-closing valve (1) 122 to opening-closing valve (4) 128 is set to either the connected state where the electromagnetic valve is opened or the closed state where the electromagnetic valve is closed, in response to a control signal transmitted from ECU 200.

In each cylinder, positions where connection pipe (1) 130 to connection pipe (4) 136 are connected are not particularly limited, so long as the combustion chamber of the cylinder in the compression stroke and the combustion chamber of the cylinder in the expansion stroke of engine 100 can establish the connected state.

In addition, a structure, a shape, and a material for connection pipe (1) 130 to connection pipe (4) 136 are not particularly limited, so long as a connection path for allowing the air-fuel mixture within the combustion chamber of the cylinder in the compression stroke to flow into the combustion chamber of the cylinder in the expansion stroke can be formed. That is, connection pipe (1) 130 to connection pipe (4) 136 may be implemented by pipes, or a connection path may be formed in the cylinder block.

The plurality of pistons slidably provided in cylinder (1) 114 to cylinder (4) 120 respectively are connected to a crankshaft 140 serving as the output shaft of engine 100 through crank mechanisms (not shown) respectively. A pulley 146 is provided at one end of crankshaft 140. A pulley 144 is provided in alternator 110. A pulley 112 is provided in air-conditioner compressor 108. Pulleys 112, 144, and 146 are connected by means of a timing belt 148. Therefore, when crankshaft 140 rotates, pulleys 112, 144 rotate by means of timing belt 148. Alternator 110 and air-conditioner compressor 108 are actuated as a result of the rotation of pulleys 112, 144.

A timing rotor (not shown) having a plurality of tooth portions is further provided at one end of crankshaft 140. The timing rotor has a plurality of protruded tooth portions. The tooth portions are provided at an angle at predetermined intervals. A crank position sensor 142 is provided so as to face the plurality of tooth portions provided in the timing rotor. Crank position sensor 142 is constituted of a coil and the like, and transmits a sense signal in accordance with an air gap from the plurality of tooth portions to ECU 200 when the timing rotor rotates.

In addition, the timing rotor has a tooth missing portion at a predetermined position. ECU 200 senses an angle of rotation of crankshaft 140, by using the position of the tooth missing portion sensed by the crank position sensor as a reference. Preferably, crank position sensor 142 can sense normal rotation and backward rotation of crankshaft 140. When engine 100 is stopped, crankshaft 140 may rotate in a backward direction. Therefore, the stop position of the piston can be controlled more accurately by sensing the backward rotation of crankshaft 140.

Engine 100 is provided with starter 106. Starter 106 is implemented, for example, by a dynamo-electric machine. Upon receiving a control signal from ECU 200 at the time of turn-on or start-up of engine 100, starter 106 is supplied with electric power to carry out what is called cranking for rotating crankshaft 140.

ECU 200 is constituted of a CPU (Central Processing Unit) (not shown) and a memory (not shown). ECU 200 calculates an angle of rotation, an angular velocity, or angular acceleration based on the sense signal received from crank position sensor 142. In addition, ECU 200 controls opening-closing valve (1) 122 to opening-closing valve (4) 128 independently of each other such that each valve is set to either the connected state or the closed state.

In the present embodiment, when engine 100 is restarted, the cylinder in the expansion stroke among cylinders (1) 114 to (4) 120 is ignited, to cause starter 106 to carry out cranking. When the cylinder in the expansion stroke is ignited, a combustion pressure within the combustion chamber is raised to push down the piston, thereby applying rotation torque to crankshaft 140. As such, quick start-up of engine 100 can be achieved and an output of starter 106 can be lowered. Therefore, starter 106 can be reduced in size.

In order to obtain desired rotation torque by igniting the cylinder in the expansion stroke, it is possible to estimate the cylinder being in the expansion stroke when engine 100 is stopped, and the fuel is injected in advance while the estimated cylinder is in the intake stroke. In such a case, however, in the compression stroke, the pressure of the air-fuel mixture in the combustion chamber of the cylinder is raised and autoignition may take place, which results in difficulty in controlling the stop position of the piston.

Meanwhile, when engine 100 is stopped, the pressure of the air-fuel mixture in the combustion chamber of the cylinder is raised until the piston of any cylinder among cylinders (1) 114 to (4) 120 goes beyond the top dead center in the compression stroke, and force against the piston (that is, force suppressing the motion of the piston) is applied. Here, the angular acceleration of crankshaft 140 becomes larger toward a backward rotation side which is opposite to the rotation direction of crankshaft 140 (a negative side, if it is assumed that the rotation direction of crankshaft 140 is positive). If the angular acceleration is greater toward the negative side, variation in the speed of rotation, that is, magnitude of torque fluctuation, is significant, which results in generation of vibration.

The present invention is characterized in that ECU 200 controls each of opening-closing valve (1) 122 to opening-closing valve (4) 128 such that the piston is stopped at a predetermined position with generation of vibration being suppressed when the operation of engine 100 is stopped.

More specifically, when an idle stop condition (a condition for stopping the engine) is satisfied and an instruction to stop the engine is issued, ECU 200 controls, among opening-closing valves (1) 122 to (4) 128, an opening-closing valve of the connection pipe connecting the cylinder in the compression stroke to the cylinder in the expansion stroke to open, in accordance with angular acceleration of crankshaft 140. That is, if the angular acceleration of crankshaft 140 is not larger than the predetermined first value, the opening-closing valve is opened. If the angular acceleration of crankshaft 140 is not smaller than the predetermined second value which is larger than the first value, the opening-closing valve is closed, thereby lowering the pressure in the combustion chamber of the cylinder in the compression stroke.

Figure 2:
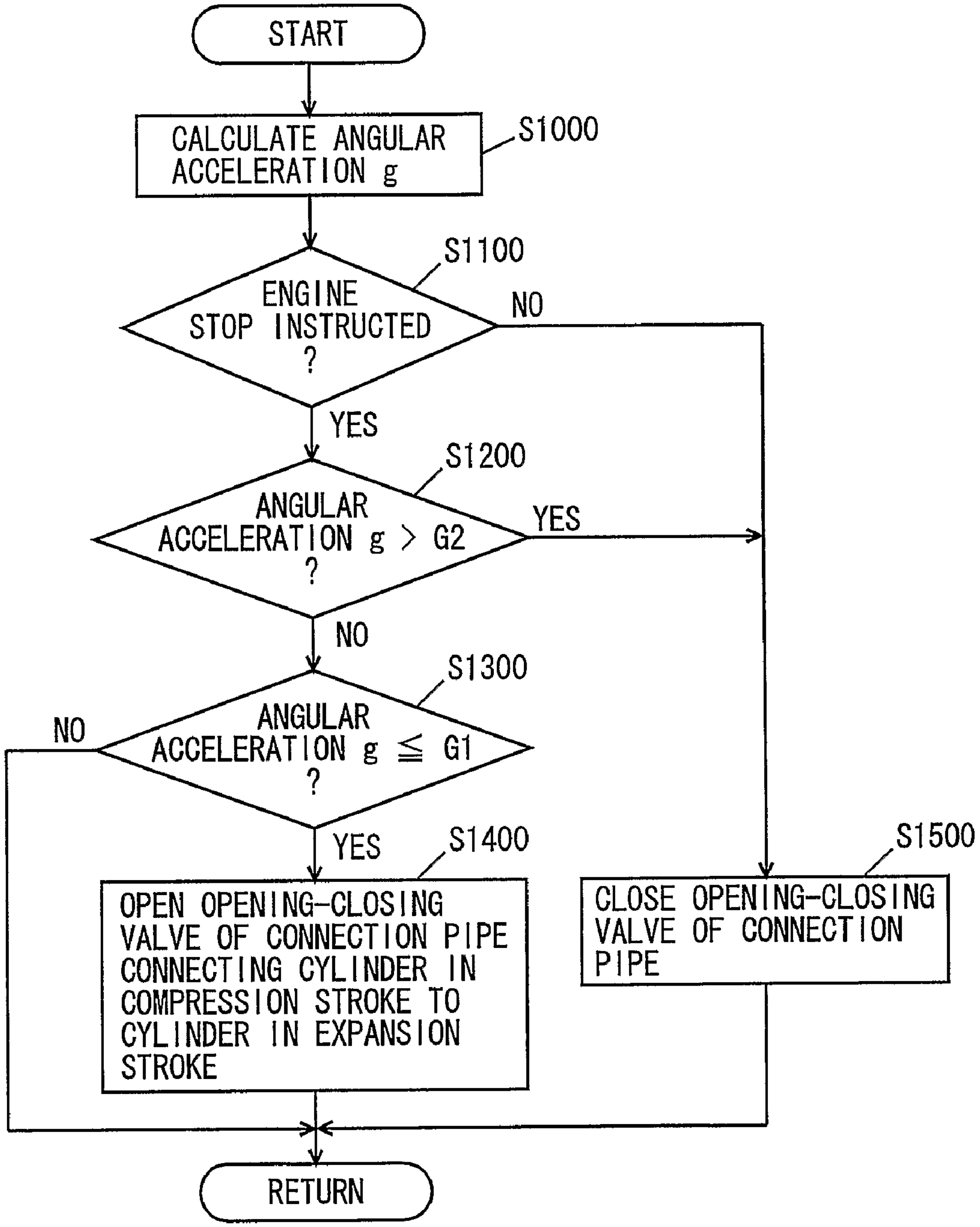
FIG. 2 is a first flowchart showing a control configuration of a program executed in an ECU serving as the control device of an internal combustion engine according to the present embodiment.

Referring to FIG. 2, a control configuration of a program for controlling the opening-closing valve so as to lower vibration generated in engine 100, that is executed in ECU 200 serving as the control device of the internal combustion engine according to the present embodiment will be described.

At step (hereinafter, a step is denoted as S) 1000, ECU 200 calculates angular acceleration g of crankshaft 140. Here, ECU 200 calculates angular acceleration g of crankshaft 140 based on the sense signal received from crank position sensor 142.

At S1100, ECU 200 determines whether or not an instruction to stop engine 100 has been issued. For example, in the case of an eco-run vehicle and a hybrid vehicle, issuance of the instruction to stop engine 100 is determined based on whether or not an idling stop condition is satisfied. If the instruction to stop engine 100 has been issued (YES at S1100), the processing proceeds to S1200. Otherwise (NO at S1100), the processing proceeds to S1500. Here, the "idling stop condition" refers to a condition set, for example, based on an operating state of engine 100, an operation state of transmission 104, and a manipulated state of a manipulation system.

At S1200, ECU 200 determines whether or not calculated angular acceleration g is larger than a threshold value G2. If calculated angular acceleration g is larger than threshold value G2 (YES at S1200), the processing proceeds to S1500. Otherwise (NO at S1200), the processing proceeds to S1300. "Threshold value G2" corresponds to the predetermined second value described above. Threshold value G2 is set so as to correspond to desired timing to close the opening-closing valve in the cylinder in the compression stroke.

At S1300, ECU 200 determines whether or not calculated angular acceleration g is not larger than a threshold value G1. If calculated angular acceleration g is not larger than threshold value G1 (YES at S1300), the processing proceeds to S1400. Otherwise (NO at S1300), the processing ends. Here, "threshold value G1" corresponds to the predetermined first value described above. Threshold value G1 is set so as to correspond to desired timing to open the opening-closing valve in the cylinder in the compression stroke. In the present embodiment, "threshold value G1" is smaller than "threshold value G2" corresponding to the second value.

At S1400, ECU 200 sets the opening-closing valve of the connection pipe connecting the cylinder in the compression stroke to the cylinder in the expansion stroke to the connected state. At S1500, ECU 200 sets the opening-closing valve of the connection pipe to the closed state.

In addition, ECU 200 estimates a cylinder to stop in the compression stroke when the engine is stopped, based on the speed of rotation and the angle of rotation of crankshaft 140. If the estimated cylinder is in the intake stroke, ECU 200 controls an injector (not shown) to inject the fuel. Then, ECU 200 controls opening-closing valve (1) 122 to opening-closing valve (4) 128 independently of each other such that the connected state is established between the estimated cylinder and the cylinder in the expansion stroke, in accordance with the angular acceleration calculated based on the speed of rotation of crankshaft 140, whereby the stop position of the piston is controlled.

Figure 3:
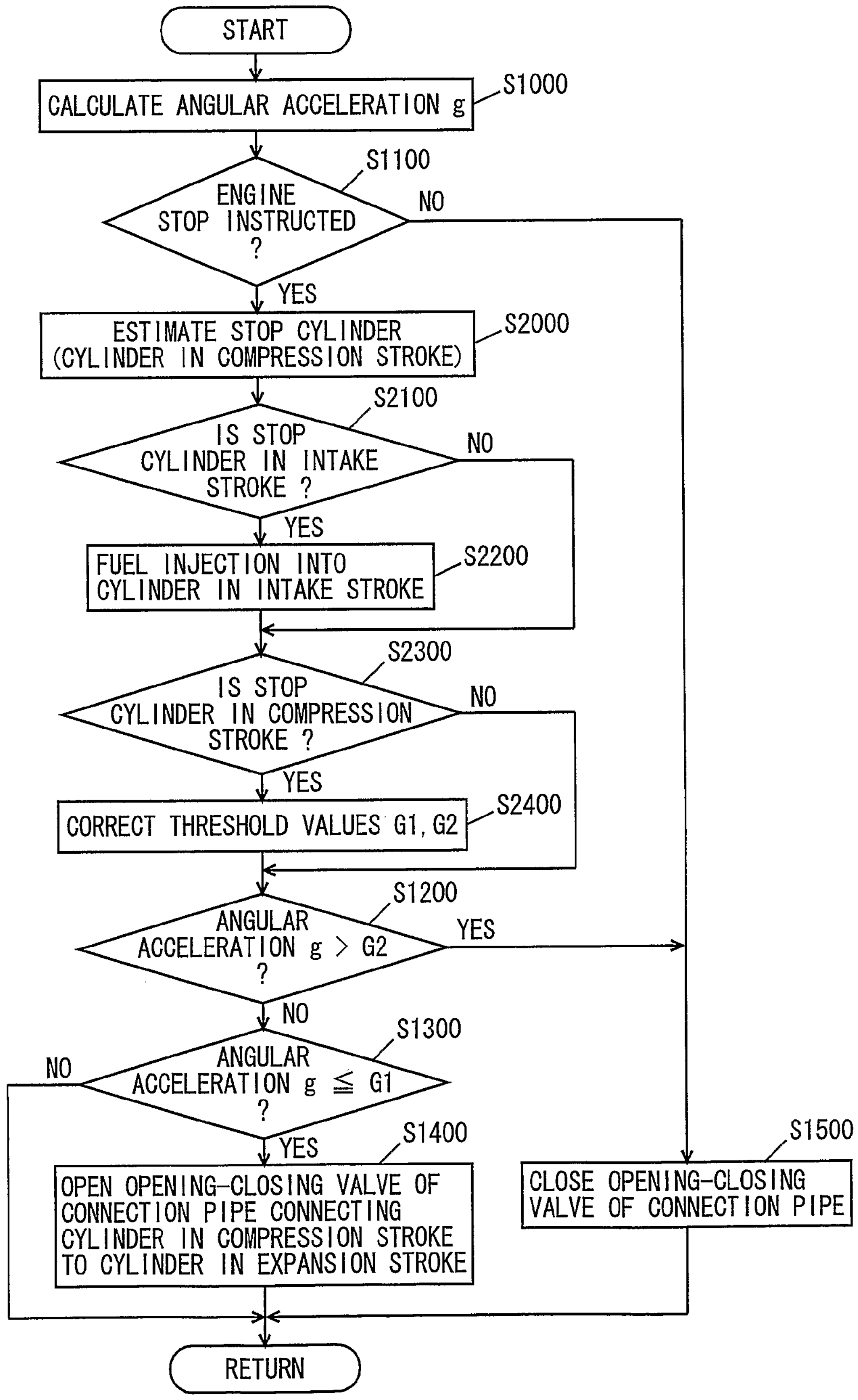
FIG. 3 is a second flowchart showing a control configuration of a program executed in an ECU serving as the control device of an internal combustion engine according to the present embodiment.

Referring to FIG. 3, a control configuration of a program for controlling a stop position of the piston, that is executed in ECU 200 serving as the control device of the internal combustion engine according to the present embodiment will be described.

The processing in the flowchart shown in FIG. 3 the same as that in FIG. 2 is given the same reference character, and the processing is also the same. Therefore, detailed description thereof will not be repeated.

At S2000, ECU 200 estimates a cylinder being in the compression stroke when engine 100 is stopped (stop cylinder) among cylinders (1) 114 to (4) 120. The stop cylinder is estimated, for example, based on the angle of rotation and the speed of rotation of crankshaft 140. For example, if the speed of rotation of crankshaft 140 is not larger than the predetermined speed of rotation, ECU 200 determines that engine 100 is about to stop, and estimates a cylinder being in the compression stroke when engine 100 is stopped, based on the speed of rotation of crankshaft 140.

At S2100, ECU 200 determines whether or not the stop cylinder estimated at S2000 is in the intake stroke. Determination as to whether or not the cylinder is in the intake stroke is based, for example, on the angle of rotation of crankshaft 140 sensed by crank position sensor 142. If the stop cylinder estimated at S2000 is in the intake stroke (YES at S2100), the processing proceeds to S2200. Otherwise (NO at S2100), the processing proceeds to S2300.

At S2200, ECU 200 controls the injector to inject the fuel into the cylinder being in the intake stroke. For example, if the speed of rotation of crankshaft 140 is not larger than the predetermined speed of rotation, ECU 200 determines that engine 100 is about to stop, and injects the fuel into the cylinder being in the intake stroke. At S2300, ECU 200 determines whether or not the stop cylinder estimated at S2000 is in the compression stroke. Determination as to whether or not the cylinder is in the compression stroke is based, for example, on the angle of rotation of crankshaft 140 sensed by crank position sensor 142. If the stop cylinder is in the compression stroke (YES at S2300), the processing proceeds to S2400. Otherwise (NO at S2300), the processing proceeds to S1200.

At S2400, ECU 200 corrects threshold values G1 and G2. Threshold values G1 and G2 are corrected when the cylinder estimated as the stop cylinder is in the compression stroke immediately before stopping of engine 100. Threshold values G1 and G2 are corrected such that the fuel flows from the cylinder in the expansion stroke to the cylinder in the compression stroke at desired timing immediately before stopping of engine 100. Here, a method of correcting threshold values G1 and G2 is not particularly limited. Threshold values G1 and G2 may be corrected by adding a correction value based on a function having the calculated angular acceleration and the speed of rotation as input values, or may be modified so as to correspond to desired timing to open the opening-closing valve and desired timing to close the opening-closing valve respectively in the cylinder being in the compression stroke immediately before stopping of engine 100.

Figure 4:
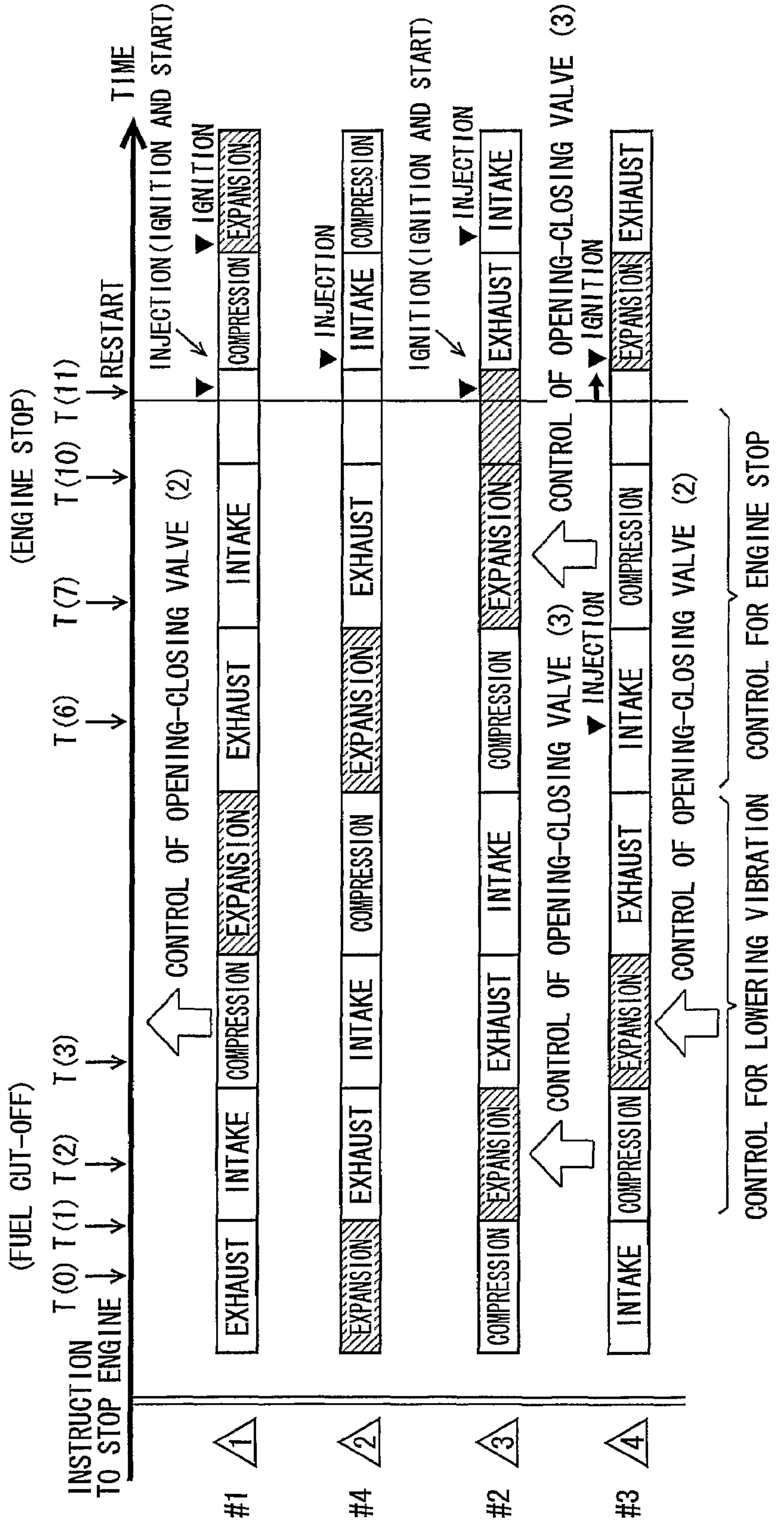
FIG. 4 is a timing chart illustrating an operation performed by the ECU serving as the control device of an internal combustion engine according to the present embodiment, for controlling an opening-closing valve.

An operation of ECU 200 serving as the control device of the internal combustion engine according to the present embodiment based on the structure and the flowchart as described above will now be discussed with reference to FIGS. 4 and 5A, 5B.

ECU 200 calculates angular acceleration g of crankshaft 140 based on the sense signal received from crank position sensor 142 (S11000). As shown in FIG. 4, when the instruction to stop engine 100 is issued at time T(0) (YES at S1100), the fuel is cut off at time T(1). At time T(2), based on angular acceleration g of crankshaft 140, opening-closing valve (3) 126 is controlled so as to set cylinder (2) 116 and cylinder (3) 118 to either the connected state or the closed state. At time T(3), opening-closing valve (2) 124 is controlled so as to set cylinder (1) 114 and cylinder (3) 118 to either the connected state or the closed state. At time T(6), when cylinder (3) 118 estimated to be in the compression stroke when the engine is stopped is in the intake stroke, the fuel is injected. At time T(7), based on angular acceleration g of crankshaft 140, opening-closing valve (3) 126 is controlled so as to set cylinder (2) 116 and cylinder (3) 118 to either the connected state or the closed state. At time T(10), engine 100 is stopped. At time T(11), cylinder (2) 116 in the expansion stroke is ignited, and ignition and start is performed along with cranking by starter 106. If desired rotation torque is obtained by igniting cylinder (2) 116 in the expansion stroke, cranking by starter 106 does not need to be performed.

Figure 5A:
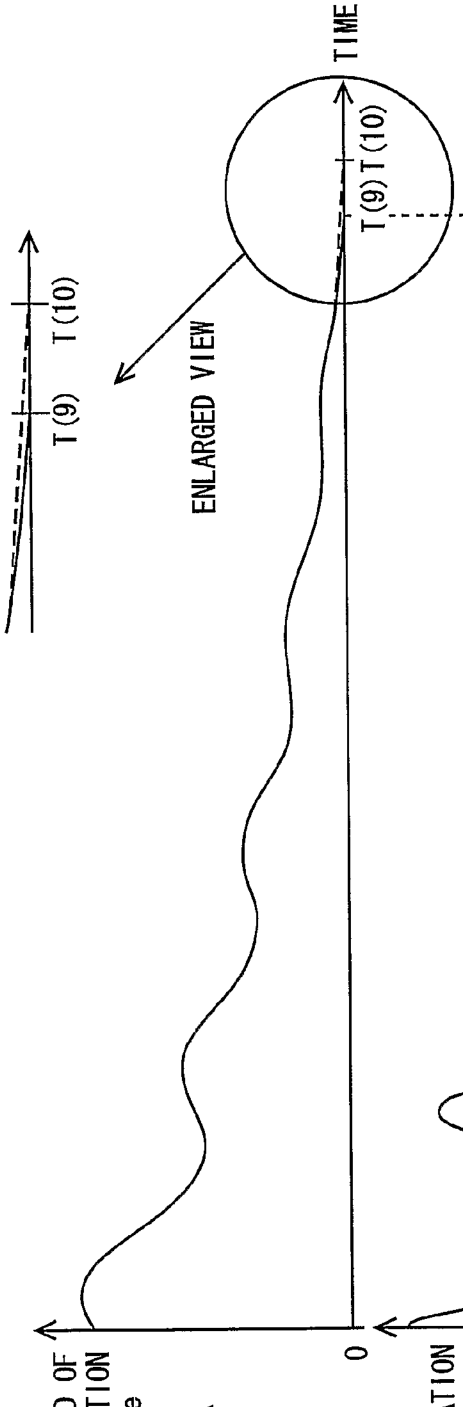
FIGS. 5A and 5B are timing charts illustrating variation in speed of rotation and angular acceleration of a crankshaft when an engine is stopped in the present embodiment.
Figure 5B:
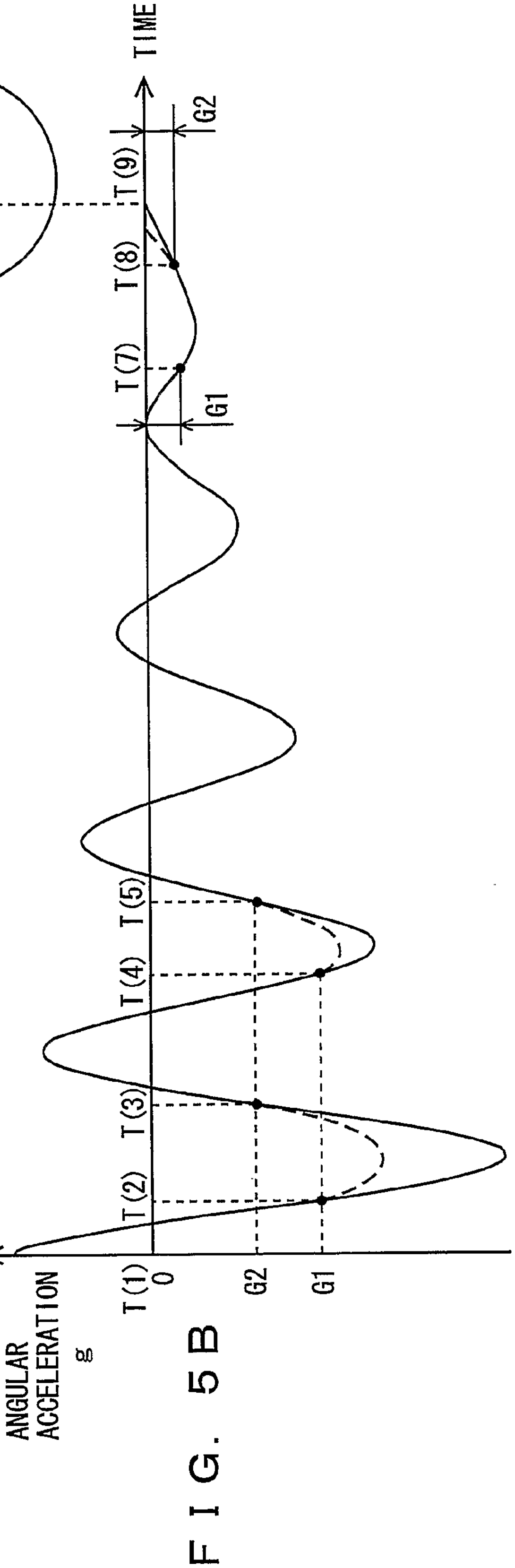

Here, as shown in FIGS. 5A and 5B, when the fuel is cut off at time T(1), crankshaft 140 rotates by inertia force. Here, when cylinder (3) 118 enters the compression stroke and the piston of cylinder (3) 118 is positioned immediately before the top dead center, the pressure of the air-fuel mixture in the combustion chamber is raised. Then, the force against the motion of the piston is applied. Accordingly, if it is assumed that the rotation direction of crankshaft 140 is positive, the angular acceleration toward the negative side becomes greater. That is, angular acceleration g of crankshaft 140 until rotation of crankshaft 140 is stopped is varied as shown with a solid line in FIG. 5B. Meanwhile, speed of rotation Ne based on the variation in angular acceleration g is varied as shown with a solid line in FIG. 5A.

At time T(2), when angular acceleration g becomes smaller than threshold value G2 (NO at S1200) as well as than threshold value G1 (YES at S1300), opening-closing valve (3) 126 of connection pipe (3) 134 connecting cylinder (2) 116 and cylinder (3) 118 to each other enters the connected state (S1400). When the connected state is established between cylinder (2) 116 and cylinder (3) 118, the air-fuel mixture flows from cylinder (2) 116 attaining higher pressure to cylinder (3) 118 attaining lower pressure, because cylinder (3) 118 has not yet been ignited. When the air-fuel mixture flows from cylinder (2) 116 to cylinder (3) 118, the pressure in the combustion chamber of cylinder (2) 116 is lowered, and the force against the motion of the piston based on the pressure in the combustion chamber is weakened. Therefore, angular acceleration g is varied as shown with a dashed line in FIG. 5B. As magnitude of torque fluctuation is thus made smaller, vibration is lowered.

When the piston of cylinder (3) 118 goes beyond the top dead center, angular acceleration g is increased (toward the positive side). At time T(3), when angular acceleration g exceeds threshold value G2 (YES at S1200), opening-closing valve (3) 126 enters the closed state (S1500), and cylinder (1) 114 enters the compression stroke. Therefore, when the piston of cylinder (1) 114 approaches the top dead center, angular acceleration g is again decreased (toward the negative side). At time T(4), when angular acceleration g becomes smaller than threshold value G1 (YES at S1300), opening-closing valve (2) 124 of connection pipe (2) 132 connecting cylinder (1) 114 and cylinder (3) 118 to each other enters the connected state (S1400). At time T(5), when angular acceleration g exceeds threshold value G2 (YES at S1200), opening-closing valve (2) 124 enters the closed state (S1500).

After the instruction to stop the engine is issued (YES at S1100), the cylinder being in the compression stroke when the engine is stopped (stop cylinder) is estimated (S2000) based on speed of rotation Ne and calculated angular acceleration g (S1000). For example, at time T(6), estimation that the stop cylinder is cylinder (3) 118 is made. Then, when the speed of rotation is not larger than the predetermined speed of rotation and cylinder (3) 118 enters the intake stroke (YES at S2100), the fuel is injected into cylinder (3) 118 (S2200). Here, the stop cylinder is not in the compression stroke (NO at S2300) and angular acceleration g is larger than threshold value G2 (YES at S1200). Therefore, all the opening-closing valves of the connection pipes are in the closed state (S1500).

In a next control routine, when cylinder (3) 118 is in the compression stroke (YES at S2300), threshold values G1 and G2 are corrected (S2400). As described previously, threshold values G1 and G2 are set so as to correspond to the desired timing to open the opening-closing valve and the desired timing to close the opening-closing valve respectively. The timing to open and close a desired opening-closing valve is set in accordance with a desired piston stop position.

After threshold values G1 and G2 are corrected and when angular acceleration g is smaller than corrected threshold value G2 (NO at S11200) as well as than threshold value G1 (YES at S1300), opening-closing valve (3) 126 of connection pipe (3) 134 connecting cylinder (2) 116 and cylinder (3) 118 to each other enters the connected state. As cylinder (3) 118 has not yet been ignited, the air-fuel mixture flows from cylinder (2) 116 attaining higher pressure to cylinder (3) 118 attaining lower pressure. At time T(8), when angular acceleration g is larger than corrected threshold value G12 (YES at S1200), opening-closing valve (3) 126 of connection pipe (3) 134 enters the closed state (S1500).

Here, as the connected state is established between cylinder (2) 116 and cylinder (3) 118, the pressure of the air-fuel mixture in the combustion chamber of cylinder (2) 116 is lowered. Accordingly, in cylinder (2) 116 in the compression stroke, the force against the piston based on the pressure in the combustion chamber is weakened. That is, as the value of angular acceleration g rapidly approaches zero, the time required for crankshaft 140 to stop (time until the speed of rotation attains to zero) is changed to a time period from time T(9) to time T(11). That is, by controlling the pressure of the air-fuel mixture in the combustion chamber of cylinder (2) 116, the stop position of crankshaft 140 can be controlled. Therefore, the piston of cylinder (2) 116 can be stopped at a desired position.

As described above, according to the control device of the internal combustion engine of the present embodiment, the cylinder in the compression stroke and the cylinder in the expansion stroke successively experiencing combustion among the plurality of cylinders are connected to each other, so that the air-fuel mixture is permitted to flow from the cylinder in the compression stroke to the cylinder in the expansion stroke. The air-fuel mixture flows into the cylinder being in the expansion stroke when the engine is stopped, to lower the pressure in the cylinder in the compression stroke, whereby autoignition can be avoided. Therefore, deterioration in accuracy in the stop position due to the torque generated by autoignition can be suppressed. In addition, by controlling the opening-closing valve to establish the connected state, the pressure within the combustion chamber in the cylinder in the compression stroke is lowered, so as to weaken the force against the motion of the piston. Accordingly, by controlling the opening-closing valve, the position of the piston when the engine is stopped can be controlled, and the stop position of the piston can be controlled with high accuracy. Therefore, the engine quickly starts and desired torque can be generated at the time of restart of the engine. In addition, when the pressure in the cylinder in the compression stroke is lowered and the pressure in the cylinder in the expansion stroke is raised, magnitude of torque fluctuation becomes small, whereby generation of vibration can be lowered. Consequently, a control device of an internal combustion engine capable of controlling a stop position of the piston with high accuracy, while suppressing generation of vibration, can be provided.

In the present embodiment, engine 100 has been described as the port injection type engine, however, the present invention can be applicable to an in-cylinder direct injection type engine, in order to lower generation of vibration when the engine is stopped.

In addition, the opening-closing valve has been controlled by using threshold values G1 and G2 in the present embodiment, however, the method of controlling the opening-closing valve is not particularly limited thereto. For example, the opening-closing valve may be controlled by using a single threshold value. That is, the control may be such that the opening-closing valve is opened when calculated angular acceleration g is not larger than the predetermined threshold value and it is closed when angular acceleration g is not smaller than the threshold value.

In the present embodiment, the vehicle in which ignition and start is performed by igniting the cylinder being in the expansion stroke when the engine is started has been described, however, application of the present invention is not particularly limited to such a vehicle.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A control device of an internal combustion engine having a plurality of cylinders in which a plurality of pistons are slidably provided respectively, comprising:

a plurality of connection paths directly connecting cylinders successively experiencing combustion to each other when said internal combustion engine is operating;

a plurality of opening-closing means for setting each said connection path to any one of a connected state and a closed state; and control means for controlling said plurality of opening-closing means such that said piston is stopped at a predetermined position when the operation of said internal combustion engine is stopped.

2. The control device of an internal combustion engine according to claim 1, wherein each said piston is connected to an output shaft of said internal combustion engine, said control device further comprises means for sensing an angle of rotation and speed of rotation of said output shaft, estimation means for estimating, among said plurality of cylinders, a cylinder being in a compression stroke when the operation of said internal combustion engine is stopped, based on said angle of rotation and the speed of rotation, and means for controlling fuel injection such that a fuel is injected when said speed of rotation is equal to or smaller than a predetermined speed of rotation and when said estimated cylinder is in an intake stroke, and said control means includes means for controlling said opening-closing means such that said connected state is established between said estimated cylinder and a cylinder in an expansion stroke.

3. The control device of an internal combustion engine according to claim 2, wherein said control means includes means for calculating angular acceleration of said output shaft based on said speed of rotation, and means for controlling said opening-closing means such that said connected state is established between a cylinder in the compression stroke and a cylinder in the expansion stroke when said angular acceleration is equal to or smaller than a predetermined first value and that said closed state is established there between when said angular acceleration is equal to or larger than a predetermined second value.

4. The control device of an internal combustion engine according to claim 1, wherein said internal combustion engine is a port injection type engine.

5. A control device of an internal combustion engine having a plurality of cylinders in which a plurality of pistons are slidably provided respectively, comprising:

a plurality of connection paths directly connecting cylinders successively experiencing combustion to each other when said internal combustion engine is operating;

a plurality of opening-closing portions setting each said connection path to any one of a connected state and a closed state; and a control unit controlling said plurality of opening-closing portions such that said piston is stopped at a predetermined position when the operation of said internal combustion engine is stopped.

6. The control device of an internal combustion engine according to claim 5, wherein each said piston is connected to an output shaft of said internal combustion engine, said control device further comprises a sensing unit sensing an angle of rotation and speed of rotation of said output shaft, an estimation unit estimating, among said plurality of cylinders, a cylinder being in a compression stroke when the operation of said internal combustion engine is stopped, based on said angle of rotation and the speed of rotation, and a fuel control unit controlling fuel injection such that a fuel is injected when said speed of rotation is equal to or smaller than a predetermined speed of rotation and when said estimated cylinder is in an intake stroke, and said control unit controls said opening-closing portions such that said connected state is established between said estimated cylinder and a cylinder in an expansion stroke.

7. The control device of an internal combustion engine according to claim 6, wherein said control unit calculates angular acceleration of said output shaft based on said speed of rotation, and controls said opening-closing portions such that said connected state is established between a cylinder in the compression stroke and a cylinder in the expansion stroke when said angular acceleration is equal to or smaller than a predetermined first value and that said closed state is established therebetween when said angular acceleration is equal to or larger than a predetermined second value.

8. The control device of an internal combustion engine according to claim 5, wherein said internal combustion engine is a port injection type engine.

* * * * *

UNITED STATES PATENT AND TRADEMARK OFFICE

CERTIFICATE OF CORRECTION

PATENT NO. : 7,546,199 B2
APPLICATION NO. : 11/632854
DATED : June 9, 2009
INVENTOR(S) : Minoru Kato It is certified that error appears in the above-identified patent and that said Letters Patent is hereby corrected as shown below:

Title Pg, Item (73) Assignee:

Please correct the Assignee's Name as follows: Toyota Jidosha Kabushiki ~~Kaishi~~ Kaisha.

Signed and Sealed this

Twenty-third Day of June, 2009

JOHN DOLL
*Acting Director of the United States Patent and Trademark Office*